United States Patent
Liu

(10) Patent No.: US 11,146,983 B2
(45) Date of Patent: Oct. 12, 2021

(54) METHOD FOR CONTROLLING NETWORK CONGESTION, TERMINAL DEVICE AND NETWORK DEVICE

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 85 days.

(21) Appl. No.: 16/734,199

(22) Filed: Jan. 3, 2020

(65) Prior Publication Data

US 2020/0145871 A1    May 7, 2020

Related U.S. Application Data

(63) Continuation of application No. PCT/CN2018/086767, filed on May 14, 2018.

(51) Int. Cl.
    *H04W 28/02*    (2009.01)
    *H04W 76/18*    (2018.01)

(52) U.S. Cl.
    CPC ... *H04W 28/0247* (2013.01); *H04W 28/0289* (2013.01); *H04W 76/18* (2018.02)

(58) Field of Classification Search
    CPC ......... H04W 28/0247; H04W 28/0289; H04W 48/06; H04W 76/18; H04W 76/27
    See application file for complete search history.

(56) References Cited

U.S. PATENT DOCUMENTS

| | | | |
|---|---|---|---|
| 2013/0016608 A1 | 1/2013 | Tiwari | |
| 2013/0286828 A1* | 10/2013 | Cho | H04W 28/02 370/230 |
| 2017/0325282 A1 | 11/2017 | Hong et al. | |
| 2018/0295539 A1* | 10/2018 | Feng | H04W 48/02 |
| 2019/0191297 A1* | 6/2019 | Huang | H04W 8/24 |
| 2019/0313473 A1 | 10/2019 | Kim et al. | |

FOREIGN PATENT DOCUMENTS

| | | |
|---|---|---|
| CN | 103118416 A | 5/2013 |
| CN | 103188728 A | 7/2013 |
| CN | 103379578 A | 10/2013 |
| CN | 104221422 A | 12/2014 |

(Continued)

OTHER PUBLICATIONS

The EESR of corresponding European application No. 18919235.4, dated Jul. 9, 2020.
The Notice of Rejection of corresponding Chinese application No. 2201880003764.2, dated May 21, 2020.
3GPP TS 23.501 V1.0.0 (Jun. 2017), 3rd Generation Partnership Project; Technical Specification Group Services and System Aspects; System Architecture for the 5G System; Stage 2(Release 15).

(Continued)

*Primary Examiner* — Kashif Siddiqui
(74) *Attorney, Agent, or Firm* — Ladas & Parry, LLP

(57) ABSTRACT

Embodiments of the present disclosure provide a method for controlling network congestion, a terminal device, and a network device, a congestion control mechanism can be performed when a state of the terminal device changes, thereby a purpose of controlling network congestion when the state of the terminal device changes is achieved. The method includes that the terminal device performs the congestion control mechanism when the state of the terminal device changes.

16 Claims, 3 Drawing Sheets

300

S310 — The network device receives first request information transmitted by the terminal device when a state of a terminal device changes, where the first request information is used to request a first service S320 — The network device transmits indication information to the terminal device when the network is in a congested state, where the indication information is used to indicate that the terminal device performs the congestion control mechanism when requesting the first service

(56) References Cited

FOREIGN PATENT DOCUMENTS

| CN | 104918283 | A | 9/2015 |
|---|---|---|---|
| CN | 106165458 | A | 11/2016 |
| CN | 107113249 | A | 8/2017 |
| CN | 107343299 | A | 11/2017 |
| CN | 107801206 | A | 3/2018 |
| CN | 107836135 | A | 3/2018 |
| WO | 2017054183 | A1 | 4/2017 |
| WO | 2018008927 | A1 | 1/2018 |
| WO | 2018008977 | A1 | 1/2018 |
| WO | 2018045511 | A1 | 3/2018 |
| WO | 2019218126 | A1 | 11/2019 |

OTHER PUBLICATIONS

3GPP TS 36.331 V13.0.0 (Dec. 2015), 3rd Generation Partnership Project; Technical Specification Group Radio Access Network; Evolved Universal Terrestrial Radio Access (E-UTRA); Radio Resource Control (RRC);Protocol specification (Release 13).
SA WG2, 3GPP TSG SA Meeting #76 TD SP-170384; Presentation of TR 23.501: System Architecture for the 5G System (Release 15) to TSG SA for Approval, Jun. 7-9, 2017, West Palm Beach, Florida, USA.
The Second Office Action of corresponding Chinese application No. 201880003764.2, dated Mar. 4, 2020.
3GPP System Architecture for the 5G System 3GPP TS 23.501 V15.1.0 (Mar. 28, 2018).
International Search Report in the international application No. PCT/CN2018/086767, dated Jan. 16, 2019.
The first OA and search report of the parallel CN application dated Dec. 3, 2019.
The first Office Action of corresponding European application No. 18919235.4, dated Jan. 26, 2021.

* cited by examiner

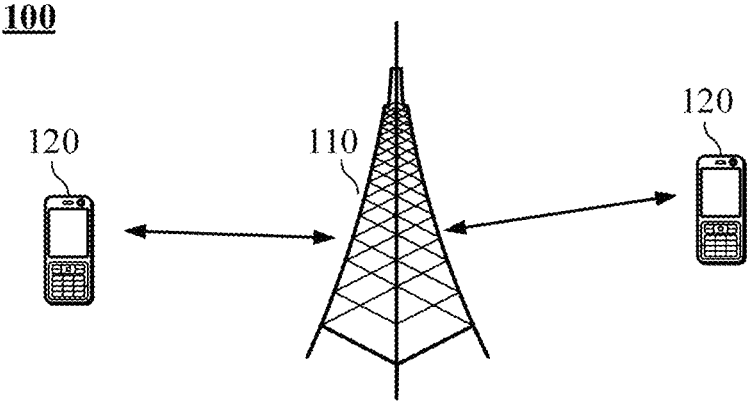

FIG. 1

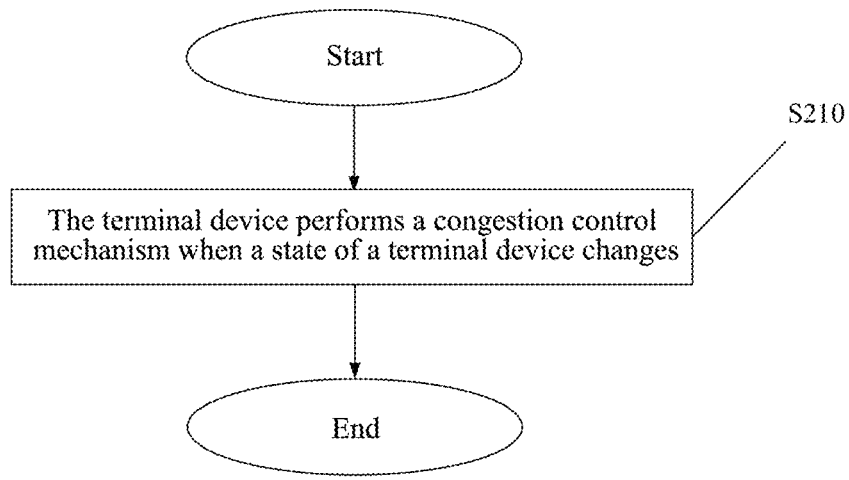

S310 — The network device receives first request information transmitted by the terminal device when a state of a terminal device changes, where the first request information is used to request a first service S320 — The network device transmits indication information to the terminal device when the network is in a congested state, where the indication information is used to indicate that the terminal device performs the congestion control mechanism when requesting the first service

FIG. 3

METHOD FOR CONTROLLING NETWORK CONGESTION, TERMINAL DEVICE AND NETWORK DEVICE

CROSS-REFERENCE TO RELATED APPLICATIONS

This application is a continuation of the International Application No. PCT/CN2018/086767, filed on May 14, 2018, the content of which is incorporated herein by reference in its entirety.

TECHNICAL FIELD

Embodiments of the present disclosure relate to the field of communication, and more specifically, to a method for controlling network congestion, a terminal device, and a network device.

BACKGROUND

In the communication technology of current stage, when a network is in a congestion state, a congestion control is performed for a connection transmitted by a terminal device, for example, when the terminal device initiates an access stratum (AS) or a non-access stratum (NAS) connection, the network entity of the access stratum or the non-access stratum rejects a request initiated by the terminal device and gives a back-off time to the terminal device, and the terminal device cannot initiate a connection request within this back-off time. However, the terminal device can have multiple states, at the same time, it can also be converted between different states for various reasons. How to control network congestion when the state conversion occurs in the terminal device is a problem urgently to be solved.

SUMMARY

Embodiments of the present disclosure provide a method for controlling network congestion, a terminal device, and a network device, which can perform a congestion control mechanism when a state of the terminal device changes, thereby a purpose of controlling network congestion when the state of the terminal device changes is achieved.

In a first aspect, a method for controlling network congestion is provided, including:

performing, by a terminal device, a congestion control mechanism when a state of the terminal device changes.

Therefore, in the embodiment of the present disclosure, when the state of the terminal device changes, the terminal device can perform the congestion control mechanism, thereby the purpose of controlling network congestion is achieved.

In some possible implementations, the congestion control mechanism includes first configuration information, where the first configuration information is at least one of the following information:

indication information indicating the terminal device to delay initiating first request information for requesting a first service, probability information that the terminal device delays initiating first request information for requesting a first service, probability information that the terminal device initiates first request information for requesting a first service within a configured delay time, indication information indicating to reject the terminal device to initiate first request information for requesting a first service, and indication information indicating to reject the terminal device to initiate a same type of the first request information for requesting a first service; and the performing, by a terminal device, a congestion control mechanism, includes:

transmitting, by the terminal device, the first request information to a network device to request the first service according to the first configuration information.

In some possible implementations, the first request information is the same or different type of information as request information used for requesting the first service that was transmitted last time.

In some possible implementations, the state of the terminal device is an access stratum state or a non-access stratum state.

In some possible implementations, when the state of the terminal device is an access stratum state, the state of the terminal device is a radio resource control (RRC) state, where the RRC state includes an idle state, a connected state and an inactive state.

In some possible implementations, when the state of the terminal device is a non-access stratum state, the state of the terminal device is one of a connect management (CM) state, a register management (RM) state, a session management (SM) state, where the CM state includes an idle state, a connected state, and a connected inactive state, and the RM state includes a registered state and a deregistered state.

In some possible implementations, the congestion control mechanism is specifically:

one of control mechanism based on a terminal device, control mechanism based on a data network name (DNN) or an access point name (APN), control mechanism based on a packet data network (PDN) connection or a protocol data unit (PDU) session, and control mechanism based on a network slice; or combination of any two or more of control mechanism based on a terminal device, control mechanism based on a DNN or an APN, control mechanism based on a PDN connection or a PDU session, and control mechanism based on a network slice.

In some possible implementations, after the state of the terminal device has changed, the method further includes:

continuing, by the terminal device, to perform the congestion control mechanism, or stopping, by the terminal device, performing the congestion control mechanism, or suspending, by the terminal device, the congestion control mechanism.

In some possible implementations, if the terminal device suspends the congestion control mechanism, the method further includes:

resuming, by the terminal device, performing the congestion control mechanism when the terminal device returns to a state before change.

In some possible implementations, the performing, by a terminal device, a congestion control mechanism when a state of the terminal device changes, includes:

transmitting, by the terminal device, first request information to a network device, where the first request information is used to request a first service;

receiving, by the terminal device, indication information for the first request information that is transmitted by the network device when the network is in a congested state, where the indication information indicates the terminal device to perform the congestion control mechanism; and performing, by the terminal device, the congestion control mechanism when requesting the first service in response to the indication information.

In a second aspect, a method for controlling network congestion is provided, including:

receiving, by a network device, first request information transmitted by a terminal device when a state of the terminal device changes, where the first request information is used to request a first service; and transmitting, by the network device, indication information to the terminal device when the network is in a congested state, where the indication information is used to indicate the terminal device to perform a congestion control mechanism when requesting the first service.

It should be noted that the network is in a congested state refers to that a network entity corresponding to the first service is in the congested state.

Therefore, in the embodiment of the present disclosure, when the state of the terminal device changes, and the network entity corresponding to the first service requested by the terminal device is in the congested state, the network device controls the terminal device to perform the congestion control mechanism when performing the first service, thereby the purpose of controlling network congestion is achieved.

In some possible implementations, the congestion control mechanism includes first configuration information, where the first configuration information is at least one of the following information:

indication information indicating the terminal device to delay to initiating second request information for requesting a first service, probability information that the terminal device delays initiating second request information for requesting a first service, probability information that the terminal device initiates second request information for requesting a first service within a configured delay time, indication information indicating to reject the terminal device to initiate second request information for requesting a first service, and indication information indicating to reject the terminal device to initiate a same type of the second request information for requesting a first service.

In some possible implementations, the second request information is the same or different type of information as the first request information.

In some possible implementations, the state of the terminal device is an access stratum state or a non-access stratum state.

In some possible implementations, when the state of the terminal device is an access stratum state, the state of the terminal device is an RRC state, where the RRC state includes an idle state, a connected state, and an inactive state.

In some possible implementations, when the state of the terminal device is a non-access stratum state, the state of the terminal device is one of a CM state, an RM state, and an SM state, where the CM state includes an idle state, a connected state, and a connected inactive state, the RM state includes a registered state and a deregistered state.

In some possible implementations, the congestion control mechanism is specifically:

one of control mechanism based on a terminal device, control mechanism based on a data network name DNN or an access point name APN, control mechanism based on a packet data network PDN connection or a protocol data unit PDU session, and control mechanism based on a network slice; or combination of any two or more of control mechanism based on a terminal device, control mechanism based on a DNN or an APN, control mechanism based on a PDN connection or a PDU session, and control mechanism based on a network slice.

In a third aspect, a terminal device is provided for performing the above methods in the first aspect or each implementation thereof.

Specifically, the terminal device includes functional modules for performing the above methods in the first aspect or each implementation thereof.

In a fourth aspect, a network device is provided for performing the above methods in the second aspect or each implementation thereof.

Specifically, the network device includes functional modules for performing the above methods in the second aspect or each implementation thereof.

In a fifth aspect, a terminal device is provided, including a processor and a memory. The memory is configured to store a computer program, and the processor is configured to call and run the computer program stored in the memory to perform the above methods in the first aspect or each implementation thereof.

In a sixth aspect, a network device is provided, including a processor and a memory. The memory is configured to store a computer program, and the processor is configured to call and run the computer program stored in the memory to perform the above methods in the second aspect or each implementation thereof.

In a seventh aspect, a chip is provided for implementing the above methods in any aspect of the first to second aspects or each implementation thereof.

Specifically, the chip includes: a processor, configured to call and run a computer program from a memory, causing a device mounted with the chip to perform the above methods in any aspect of the first to second aspects or each implementation thereof.

In an eighth aspect, a computer readable storage medium is provided for storing a computer program, the computer program causes a computer to perform the above methods in any aspect of the first to second aspects or each implementation thereof.

In a ninth aspect, a computer program product is provided, including computer program instructions, the computer program instructions causes a computer to perform the above methods in any aspect of the first to second aspects or each implementation thereof.

In a tenth aspect, a computer program is provided, which, when run on a computer, causes the computer to perform the above methods in any aspect of the first to second aspects or each implementation thereof.

In an eleventh aspect, a wireless communication system is provided, including a terminal device and a network device; where, the terminal device is configured to perform a congestion control mechanism when a state of the terminal device changes;

the network device is configured to receive first request information transmitted by the terminal device when the state of the terminal device changes, where the first request information is used to request a first service; and transmit indication information to the terminal device when the network is in a congested state, the indication information is used to indicate the terminal device to perform the congestion control mechanism when requesting the first service.

Specifically, the terminal device is configured to perform the above methods in the first aspect or each implementation thereof, and the network device is configured to perform the above methods in the second aspect or each implementation thereof.

BRIEF DESCRIPTION OF DRAWINGS

FIG. 1 is a schematic diagram of an application scenario of an embodiment of the present disclosure.

FIG. 2 is a schematic flowchart of a method for controlling network congestion according to an embodiment of the present disclosure.

FIG. 3 is a schematic flowchart of a method for controlling network congestion according to another embodiment of the present disclosure.

DESCRIPTION OF EMBODIMENTS

Figure 4:
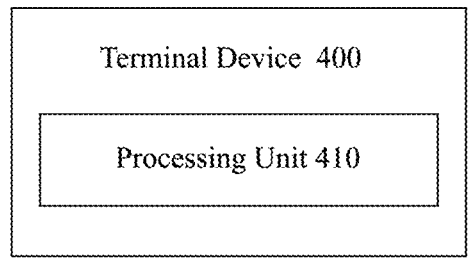
FIG. 4 is a schematic block diagram of a terminal device according to an embodiment of the present disclosure.

The technical solutions in the present disclosure will be described below with reference to the accompanying drawings in embodiments of the present disclosure.

Embodiments of the present disclosure can be applied to various communication systems, such as a global system of mobile communication (GSM) system, a code division multiple access (CDMA) system, a wideband code division multiple access (WCDMA) system, a general packet radio service (GPRS) system, a long term evolution (LTE) system, an advanced long term evolution (LTE-A) system, a new radio (NR) system, an evolution system of NR system, an LTE-based access to unlicensed spectrum (LTE-U) system, an NR-based access to unlicensed spectrum (NR-U) system, an universal mobile telecommunication system (UMTS), a wireless local area networks (WLAN), a wireless Fidelity (WiFi), a next-generation communication system, or other communication systems, etc.

In general, a connection number that traditional communication systems support is limited and is easy to implement. However, with the development of communication technologies, mobile communication systems will not only support traditional communication, but also support, for example, device to device (D2D) communication, machine to machine (M2M) communication, machine type communication (MTC), and vehicle to vehicle (V2V) communication, or the like, and the embodiments of the present disclosure can also be applied to these communication systems.

In an embodiment, a communication system in the embodiments of the present disclosure may be applied to a carrier aggregation (CA) scenario, and may also be applied to a dual connectivity (DC) scenario, and may further be applied to a standalone (SA) Network Distribution scenario.

The embodiments of the present disclosure do not limit the applied spectrum. For example, the embodiments of the present disclosure can be applied to a grant spectrum, and can also be applied to a grant-free spectrum.

The embodiments of the present disclosure describe various embodiments in combination with a network device and a terminal device, where: the terminal device may also be referred to as a user equipment (UE), an access terminal, a subscriber unit, a subscriber station, a mobile station, a mobile platform, a remote station, a remote terminal, a mobile device, a user terminal, a terminal, a wireless communication device, a user agent or a user device, etc. The terminal device can be an STA (STAION) in a wireless local area network (WLAN), a cellular phone, a cordless phone, an SIP (Session Initiation Protocol) phone, a WLL (Wireless Local Loop) station, a PDA (Personal Digital Assistant) device, a handheld device with wireless communication function, a computing device or other processing devices connected to wireless modems, an in-vehicle device, a wearable device, and a terminal device in a next-generation communication system, such as an NR network or a terminal device in a future evolved public land mobile network (PLMN) network or the like.

As an example rather than a limitation, in the embodiments of the present disclosure, the terminal device may also be a wearable device. The wearable device, which can also be referred as a wearable intelligent device, is a generic term for applying wearable technology to perform intellectualized design for daily wear and developing wearable devices, such as glasses, gloves, watches, clothing, and shoes, etc. A wearable device is a portable device that is worn directly on the body or integrated into a user's clothing or accessories. The wearable device is not only a hardware device, but also implements powerful functions through software support, data interaction, and cloud interaction. Generalized wearable intelligent devices include full-featured, large-size, and may implement full or partial functions without relying on smartphones, such as smart watches or smart glasses, and only focus on one type of application function that need to be cooperatively used with other devices such as smartphones, such as various smart bracelets and smart jewelries for signs monitoring, etc.

The network device may be a device for communicating with a mobile device, and the network device may be an access point (AP) in a WLAN, a base transceiver station (BTS) in a GSM or CDMA, and may also be a base station (NodeB, NB) in a WCDMA, and may further be an evolutional base station (evolutional Node B, eNB or eNodeB) in an LTE, or a relay station or an access point, or an in-vehicle device, a wearable device, and a network device (gNB) in a NR network, or a network device in a future evolved PLMN network or the like.

In the embodiments of the present disclosure, the network device provides a service for a cell, and the terminal device communicates with the network device through a transmission resource (for example, a frequency domain resource, or a spectrum resource) used by the cell, and the cell may be a cell corresponding to the network device (for example, base station), the cell may belong to a macro base station, may also belong to a base station corresponding to a small cell, and the small cell herein may include: a metro cell, a micro cell, a pico cell, a femto cell, and the like, these small cells have the characteristics of small coverage and low transmitting power, and are suitable for providing high-speed data transmission services.

FIG. 1 exemplarily shows one network device and two terminal devices, in an embodiment, the wireless communication system 100 may include a plurality of network devices and other numbers of terminal devices may include in the coverage of each network device, the embodiment of the present disclosure is not limited thereto.

In an embodiment, the wireless communication system 100 may further include other network entities, such as a mobility management entity (MME), an access and mobility management function (AMF), and the like, the embodiment of the present disclosure is not limited thereto.

Furthermore, various aspects or features of the present disclosure can be implemented as methods, devices, or products using standard programming and/or engineering technology. The term "product" used in present disclosure contains a computer program accessible from any computer-readable device, carrier, or medium. For example, a computer readable medium may include, but is not limited to: a magnetic storage device (for example, a hard disk, a floppy disk, or a magnetic tape, or the like), an optical disc (for example, a compact disc (CD), a digital versatile disc (DVD), or the like), a smart card and a flash memory device (for example, erasable programmable read-only memory (EPROM), card, stick or key driver, or the like). Additionally, various storage medium described herein can represent one or more devices for storing information and/or other machine-readable medium. The term "machine-readable medium" may include, but is not limited to, various medium capable of storing, containing, and/or carrying instructions and/or data.

It should be understood that the terms "system" and "network" are often used interchangeably herein. The term "and/or" herein is merely an association relationship describing associated objects, indicating that there may be three relationships, for example, A and/or B, which may indicate these three situations that A exists separately, both A and B exist, and B exists separately. In addition, the character "/" herein generally indicates that the back and forth associated object is an "or" relationship.

The methods for controlling network congestion in the embodiments of the present disclosure are described below in combination with FIG. 2 to FIG. 3. It should be understood that FIG. 2 to FIG. 3 are schematic flowcharts of methods for controlling network congestion according to embodiments of the present disclosure, and show detailed communication steps or operations of the methods, but the steps or operations are merely examples, the embodiments of the present disclosure may also perform other operations or variants of the various operations in FIG. 2 to FIG. 3, that is, the embodiments of the present disclosure do not limit the performing order of the various steps in FIG. 2 to FIG. 3.

In addition, the various steps in FIG. 2 to FIG. 3 may be performed in a different order from that presented in FIG. 2 to FIG. 3, respectively, and it is possible that not all operations in FIG. 2 to FIG. 3 are to be performed.

FIG. 2 is a schematic flowchart of a method 200 for controlling network congestion according to an embodiment of the present disclosure. The method 200 is applicable to the system shown in FIG. 1, but is not limited thereto. The method 200 includes at least partial content of the following content.

S210, the terminal device performs a congestion control mechanism when a state of a terminal device changes.

In an embodiment, the congestion control mechanism includes first configuration information, where the first configuration information is at least one of the following information:

indication information indicating the terminal device to delay initiating first request information for requesting a first service, probability information that the terminal device delays initiating first request information for requesting a first service, probability information that the terminal device initiates first request information for requesting a first service within a configured delay time, indication information indicating to reject the terminal device to initiate first request information for requesting a first service, and indication information indicating to reject the terminal device to initiate a same type of the first request information for requesting a first service.

Specifically, the terminal device transmits the first request information to a network device to request the first service according to the first configuration information.

For example, when the state of the terminal device changes, the terminal device transmits the first request information to the network device, and the first request information is used to request a PDU session service, however, a session management function (SMF) for the PDU session service is in a congested state, at this time, the terminal device can determine how to request the PDU session service according to the first configuration information.

In an embodiment, the first request information is the same or different type of information as request information used to request the first service that was transmitted last time.

In an embodiment, the congestion control mechanism includes manners as described below:

indication information configured by the network device to the terminal device to delay initiating a connecting request, for example, time information that the terminal device delays initiating the connecting request; probability information that the terminal device delays initiating the connecting request; probability information that the terminal device initiates the connecting request within a configured delay time, or the like; indication information that the network device rejects the terminal device to initiate the connecting request; further, indication information that the network device rejects the terminal device to initiate a connecting request with the same type.

Further, the information of the connecting request may be the same or different type of information as the previous connecting request.

In an embodiment, the state of the terminal device is an access stratum state or a non-access stratum state.

When the state of the terminal device is an access stratum state, the state of the terminal device is an RRC state, where the RRC state includes an idle state, a connected state, and an inactive state.

For example, when the state of the terminal device is the RRC state under the access stratum state, the terminal device may be in the idle state, may also be in the connected state, and may further be in the inactive state.

When the state of the terminal device is a non-access stratum state, the state of the terminal device is one of a CM state, an RM state, and an SM state, where the CM state includes an idle state, a connected state, and a connected inactive state, the RM state includes a registered state and a deregistered state.

For example, when the state of the terminal device is the CM state under the non-access stratum state, the terminal device may be in the idle state, may also be in the connected state, and may also be in the connected inactive state.

As another example, when the state of the terminal device is the RM state under the non-access stratum state, the terminal device may be in the registration state, and may also be in the deregistration state.

In an embodiment, the congestion control mechanism is specifically:

one of control mechanism based on a terminal device, control mechanism based on a DNN or an APN, control mechanism based on a PDN connection or a PDU session, and control mechanism based on a network slice; or combination of any two or more of control mechanism based on a terminal device, control mechanism based on a DNN or an APN, control mechanism based on a PDN connection or a PDU session, and control mechanism based on a network slice.

For example, a network slice 1 and a network slice 2 exist simultaneously, a DNN1 on the network slice 1 corresponds to a congestion control mechanism 1, and a DNN2 on the network slice 2 corresponds to a congestion control mechanism 2, and the congestion control mechanism 1 and the congestion control mechanism 2 can be different.

For another example, a network slice 1 and a network slice 2 exist simultaneously, a PDN connection 1 on the network slice 1 corresponds to a congestion control mechanism 1, a PDN connection 2 on the network slice 2 corresponds to a congestion control mechanism 2, and the congestion control mechanism 1 and the congestion control mechanism 2 can be different.

It should be noted that the above is only exemplified by taking combinations of network slices and DNN, and network slices and PDN connection as examples. Combination of any two or more of control mechanism based on a terminal device, control mechanism based on a DNN or an APN, control mechanism based on a PDN connection or a PDU session, and control mechanism based on a network slice, are applicable to the above example manners.

In an embodiment, as an embodiment, when the state of the terminal device changes, the terminal device performs the congestion control mechanism, and after the state of the terminal device has changed, the method 200 further includes:

the terminal device continues to perform the congestion control mechanism, or the terminal device stops performing the congestion control mechanism, or the terminal device suspends the congestion control mechanism.

Further, in this embodiment, if the terminal device suspends the congestion control mechanism, the method 200 further includes:

the terminal device resumes performing the congestion control mechanism when the terminal device returns to a state before the change.

In an embodiment, as an embodiment, the step S210 may specifically be:

the terminal device transmits first request information to a network device, where the first request information is used to request a first service;

when the network is in a congested state, the terminal device receives indication information for the first request information that is transmitted by the network device, where the indication information indicates the terminal device to perform the congestion control mechanism; and the terminal device performs the congestion control mechanism when requesting the first service in response to the indication information.

In an embodiment, as an embodiment, the terminal device is in a CM idle state, and the terminal device initiates a PDU session request 1 based on \the network slice 1 and/or the DNN1, and after receiving the request of the terminal device, the network device initiates a back-off command with a back-off time to the terminal device when a network device entity congestion corresponding to the PDU session 1 of the network slice 1 and/or the DNN1 is detected, and the terminal device cannot initiate the PDU session request 1 within the back-off time. The terminal device in turn initiates a PDU session request for the network slice 2 and/or the DNN2 and which is successful established, and the terminal device enters a CM connected state. At this time, the processing of the terminal device for the PDU session request 1 may have manners as described below:

manner 1, continue to perform a back-off congestion control, and a back-off timer continues to run. When the timer expires, the terminal device continues to initiate a request for the PDU session 1;

manner 2, stop performing the back-off congestion control, and the terminal device immediately initiates a PDU session 1 request.

Therefore, in the embodiment of the present disclosure, when the state of the terminal device changes, the terminal device can perform the congestion control mechanism, thereby the purpose of controlling network congestion is achieved.

FIG. 3 is a schematic flowchart of a method 300 for controlling network congestion according to an embodiment of the present disclosure. The method 300 can be applied to the system shown in FIG. 1, but is not limited thereto. The method 300 includes at least partial content of the following content.

S310, the network device receives first request information transmitted by the terminal device when a state of a terminal device changes, where the first request information is used to request a first service.

S320, the network device transmits indication information to the terminal device when the network is in a congested state, where the indication information is used to indicate the terminal device to perform a congestion control mechanism when requesting the first service.

In an embodiment, the congestion control mechanism includes first configuration information, where the first configuration information is at least one of the following information:

indication information indicating the terminal device to delay to initiating second request information for requesting a first service, probability information that the terminal device delays initiating second request information for requesting a first service, probability information that the terminal device initiates second request information for requesting a first service within a configured delay time, indication information indicating to reject the terminal device to initiate second request information for requesting a first service, and indication information indicating to reject the terminal device to initiate a same type of the second request information for requesting a first service.

In an embodiment, the second request information is the same or different type of information as the first request information.

In an embodiment, the state of the terminal device is an access stratum state or a non-access stratum state.

In an embodiment, when the state of the terminal device is an access stratum state, the state of the terminal device is an RRC state, where the RRC state includes an idle state, a connected state, and an inactive state.

In an embodiment, when the state of the terminal device is a non-access stratum state, the state of the terminal device is one of a CM state, an RM state, and an SM state, where the CM state includes an idle state, a connected state and a connected inactive state, the RM state includes a registered state and a deregistered state.

In an embodiment, the congestion control mechanism is specifically:

one of control mechanism based on a terminal device, control mechanism based on a data network name DNN or an access point name APN, control mechanism based on a packet data network PDN connection or a protocol data unit PDU session, and control mechanism based on a network slice; or combination of any two or more of control mechanism based on a terminal device, control mechanism based on a DNN or an APN, control mechanism based on a PDN connection or a PDU session, and control mechanism based on a network slice.

It should be understood that the steps in the method 300 for controlling network congestion may refer to corresponding steps in the method 200 for controlling network congestion. For brevity, details are not described herein again.

Therefore, in the embodiment of the present disclosure, when the state of the terminal device changes, and the network entity corresponding to the first service requested by the terminal device is in a congested state, the network device controls the terminal device to perform the congestion control mechanism when performing the first service, thereby the purpose of controlling network congestion is achieved.

FIG. 4 is a schematic block diagram of a terminal device 400 according to an embodiment of the present disclosure. As shown in FIG. 4, the terminal device 400 includes:

a processing unit 410, configured to perform a congestion control mechanism when a state of the terminal device changes.

In an embodiment, the congestion control mechanism includes first configuration information, where the first configuration information is at least one of the following information:

indication information indicating the terminal device to delay initiating first request information for requesting a first service, probability information that the terminal device delays initiating first request information for requesting a first service, probability information that the terminal device initiates first request information for requesting a first service within a configured delay time, indication information indicating to reject the terminal device to initiate first request information for requesting a first service, and indication information indicating to reject the terminal device to initiate a same type of the first request information for requesting a first service; and the processing unit 410 is specifically configured to:

transmit the first request information to a network device to request the first service according to the first configuration information.

In an embodiment, the first request information is the same or different type of information as request information for requesting the first service that was transmitted last time.

In an embodiment, the state of the terminal device is an access stratum state or a non-access stratum state.

In an embodiment, when the state of the terminal device is an access stratum state, the state of the terminal device is an RRC state.

In an embodiment, the RRC state includes an idle state, a connected state, and an inactive state.

In an embodiment, when the state of the terminal device is a non-access stratum state, the state of the terminal device is one of a CM state, an RM state, and an SM state.

In an embodiment, the CM state includes an idle state, a connected state, and a connected inactive state, the RM state includes a registered state and a deregistered state.

In an embodiment, the congestion control mechanism is specifically:

one of control mechanism based on a terminal device, control mechanism based on a data network name DNN or an access point name APN, control mechanism based on a packet data network PDN connection or a protocol data unit PDU session, and control mechanism based on a network slice; or combination of any two or more of control mechanism based on a terminal device, control mechanism based on a DNN or an APN, control mechanism based on a PDN connection or a PDU session, and control mechanism based on a network slice.

In an embodiment, after the state of the terminal device has changed, the processing unit 410 is further configured to:

continue to perform the congestion control mechanism, or stop performing the congestion control mechanism, or suspend the congestion control mechanism.

In an embodiment, if the processing unit 410 suspends the congestion control mechanism, the processing unit 410 is further configured to:

resume performing the congestion control mechanism when the terminal device returns to a state before the change.

In an embodiment, the terminal device 400 further includes a communication unit 420, the processing unit 410 is specifically configured to:

control the communication unit 420 to transmit the first request information to the network device, where the first request information is used to request the first service;

control the communication unit 420 to receive indication information for the first request information that is transmitted by the network device when the network is in a congested state, where the indication information indicates the terminal device to perform the congestion control mechanism; and perform the congestion control mechanism when requesting the first service in response to the indication information.

It should be understood that the above-mentioned and other operations and/or functions of the various modules in the terminal device 400 according to the embodiment of the present disclosure are respectively for implementing the corresponding processes of the terminal device in the method 200 in FIG. 2. For brevity, details are not described herein again.

Figure 5:
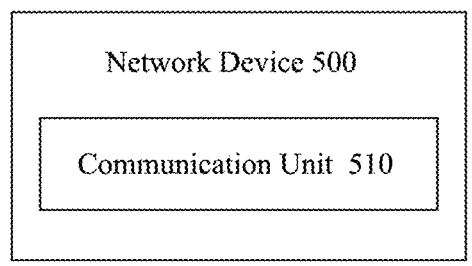
FIG. 5 is a schematic block diagram of a network device according to an embodiment of the present disclosure.

FIG. 5 is a schematic block diagram of a network device 500 according to an embodiment of the present disclosure. As shown in FIG. 5, the network device 500 includes:

a communication unit 510, configured to receive first request information transmitted by a terminal device when a state of the terminal device changes, where the first request information is used to request a first service; and the communication unit 510 is further configured to transmit indication information to the terminal device when the network is in a congested state, where the indication information is used to indicate the terminal device to perform a congestion control mechanism when requesting the first service.

In an embodiment, the congestion control mechanism includes first configuration information, where the first configuration information is at least one of the following information:

indication information indicating the terminal device to delay to initiating second request information for requesting a first service, probability information that the terminal device delays initiating second request information for requesting a first service, probability information that the terminal device initiates second request information for requesting a first service within a configured delay time, indication information indicating to reject the terminal device to initiate second request information for requesting a first service, and indication information indicating to reject the terminal device to initiate a same type of the second request information for requesting a first service.

In an embodiment, the second request information is the same or different type of information as the first request information.

In an embodiment, the state of the terminal device is an access stratum state or a non-access stratum state.

In an embodiment, when the state of the terminal device is an access stratum state, the state of the terminal device is an RRC state.

In an embodiment, the RRC state includes an idle state, a connected state, and an inactive state.

In an embodiment, when the state of the terminal device is a non-access stratum state, the state of the terminal device is one of a CM state, an RM state, and an SM state.

In an embodiment, the CM state includes an idle state, a connected state, and a connected inactive state, the RM state includes a registered state and a deregistered state.

In an embodiment, the congestion control mechanism is specifically:

one of control mechanism based on a terminal device, control mechanism based on a data network name DNN or an access point name APN, control mechanism based on a packet data network PDN connection or a protocol data unit PDU session, and control mechanism based on a network slice; or combination of any two or more of control mechanism based on a terminal device, control mechanism based on a DNN or an APN, control mechanism based on a PDN connection or a PDU session, and control mechanism based on a network slice.

It should be understood that the above-mentioned and other operations and/or functions of the various modules in the network device 500 according to the embodiment of the present disclosure are respectively for implementing the corresponding processes of the network device in the method 300 in FIG. 3.

Figure 6:
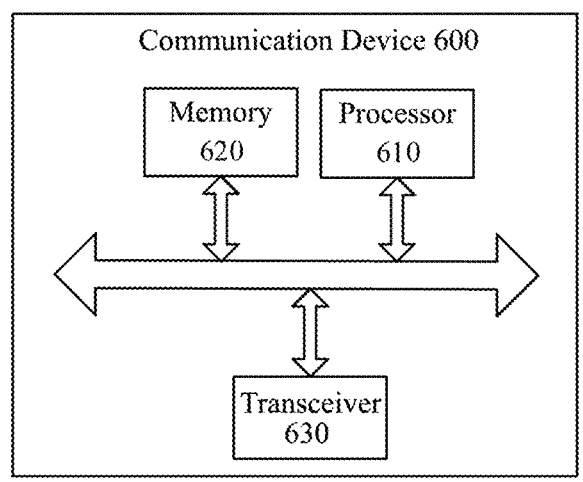
FIG. 6 is a schematic block diagram of a communication device according to an embodiment of the present disclosure.

FIG. 6 is a schematic block diagram of a communication device 600 according to an embodiment of the present disclosure. The communication device 600 shown in FIG. 6 includes a processor 610 that can call and run a computer program from a memory to implement the methods in the embodiments of the present disclosure.

In an embodiment, as shown in FIG. 6, the communication device 600 may further include a memory 620. Where, the processor 610 can call and run a computer program from the memory 620 to implement the methods in the embodiments of the present disclosure.

Where, the memory 620 may be a separate device independent of the processor 610 or may be integrated in the processor 610.

In an embodiment, as shown in FIG. 6, the communication device 600 may further include a transceiver 630, and the processor 610 may control the transceiver 630 to communicate with other devices, specifically, may transmit information or data to other devices, or receive information or data transmitted by the other devices.

Where, the transceiver 630 may include a transmitter and a receiver. The transceiver 630 may further include an antenna, and the number of the antennas may be one or more.

In an embodiment, the communication device 600 may be the network device of the embodiments of the present disclosure, and the communication device 600 can implement the corresponding processes implemented by the network device in each method of the embodiments of the present disclosure. For brevity, details are not described herein again.

In an embodiment, the communication device 600 may be the terminal device of the embodiments of the present disclosure, and the communication device 600 can implement the corresponding processes implemented by the terminal device in each method of the embodiments of the present disclosure. For brevity, details are not described herein again.

Figure 7:
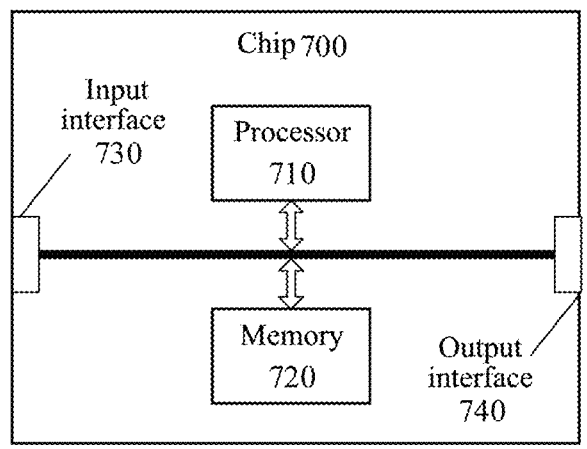
FIG. 7 is a schematic block diagram of a chip according to an embodiment of the present disclosure.

FIG. 7 is a schematic block diagram of a chip 700 according to an embodiment of the present disclosure. The chip 700 shown in FIG. 7 includes a processor 710 that can call and run a computer program from a memory to implement the methods in the embodiments of the present disclosure.

In an embodiment, as shown in FIG. 7, the chip 700 may further include a memory 720. Where, the processor 710 can invoke and run a computer program from the memory 720 to implement the methods in the embodiments of the present disclosure.

Where, the memory 720 may be a separate device independent of the processor 710 or may be integrated in the processor 710.

In an embodiment, the chip 700 may further include an input interface 730. Where, the processor 710 can control the input interface 730 to communicate with other devices or chips, specifically, can acquire information or data transmitted by the other devices or chips.

In an embodiment, the chip 700 may further include an output interface 740. Where, the processor 710 can control the output interface 740 to communicate with other devices or chips, specifically, can output information or data to the other devices or chips.

In an embodiment, the chip can be applied to the network device in the embodiments of the present disclosure, and the chip can implement the corresponding processes implemented by the network device in each method of the embodiments of the present disclosure. For brevity, details are not described herein again.

In an embodiment, the chip can be applied to the terminal device in the embodiments of the present disclosure, and the chip can implement the corresponding processes implemented by the terminal device in each method of the embodiments of the present disclosure. For brevity, details are not described herein again.

It should be understood that the chip mentioned in the embodiments of the present disclosure may also be referred to as a system level chip, a system chip, a chip system or a system on chip.

The processor mentioned above may be a general purpose processor, a digital signal processor (DSP), a field programmable gate array (FPGA), an application specific integrated circuit (ASIC) or other programmable logic devices, transistor logic devices, discrete hardware components, or the like. Where, the above-mentioned general purpose processor may be a microprocessor or may be any conventional processor or the like.

The memory mentioned above may be a volatile memory or a non-volatile memory, or may include both volatile and non-volatile memory. Where, the non-volatile memory may be a read-only memory (ROM), a programmable ROM (PROM), an erasable PROM (EPROM), an electrically EPROM (EEPROM) or a flash memory. The volatile memory may be a random access memory (RAM).

It should be understood that the above-mentioned memory is exemplary but not limited. For example, the memory in the embodiments of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM) and a Direct Rambus RAM (DR RAM) or the like. That is, the memory in the embodiments of the present disclosure is intended to include, but is not limited to, these and any other suitable types of memory.

Figure 8:
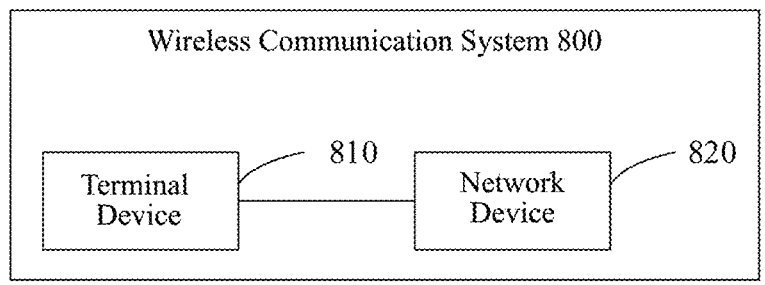
FIG. 8 is a schematic block diagram of a wireless communication system according to an embodiment of the present disclosure.

FIG. 8 is a schematic block diagram of a wireless communication system 800 according to an embodiment of the present disclosure. As shown in FIG. 8, the wireless communication system 800 includes a terminal device 810 and a network device 820. Where, the terminal device 810 is configured to perform a congestion control mechanism when a state of the terminal device changes. The network device 820 is configured to receive first request information transmitted by the terminal device when the state of the terminal device changes, where the first request information is used to request a first service; and transmit indication information to the terminal device when the network is in a congested state, the indication information is used to indicate the terminal device to perform the congestion control mechanism when requesting the first service.

Where, the terminal device 810 can be used to implement the corresponding functions implemented by the terminal device in the above method 200, and the composition of the terminal device 810 can be shown as the terminal device 400 in FIG. 4. For brevity, details are not described herein again.

The network device 820 can be used to implement the corresponding functions implemented by the network device in the above method 300, and the composition of the network device 820 can be shown as the network device 500 in FIG. 5. For brevity, details are not described herein again.

In the above embodiments, they may be implemented in whole or in part by software, hardware, firmware, or any combination thereof. When implemented by using software, they may be implemented in whole or in part in a form of a computer program product. The computer program product includes one or more computer instructions. When the computer program instructions are loaded and executed on a computer, the processes or functions described according to the embodiments of the present disclosure are generated in whole or in part. The computer can be a general purpose computer, a dedicated computer, a computer network, or other programmable devices. The computer instructions can be stored in a computer readable storage medium, or transferred from one computer readable storage medium to another computer readable storage medium, for example, the computer instructions can perform transmission from one website site, computer, server or data center to another website site, computer, server or data center by means of wired (for example, coaxial cable, fiber optic, digital subscriber line (DSL)) or wireless (for example, infrared, wireless, microwave, or the like). The computer readable storage medium can be any available medium that can be accessed by a computer or a data storage device such as an integrated server that includes one or more available medium, data center, or the like. The available medium can be a magnetic medium (for example, a floppy disk, a hard disk, a magnetic tape), an optical medium (for example, a DVD), or a semiconductor medium (for example a solid state disk (SSD)).

It should be understood that, in the various embodiments of the present disclosure, the size of the sequence numbers of the above various processes does not mean the sequence of the performing order, and the performing order of each process should be determined by its function and internal logic, and should not constitute any limitation to the implementation processes of the embodiments of the present disclosure.

A person skilled in the art can clearly understand that for the convenience and brevity of the description, the specific operation processes of the systems, devices and units described above can refer to the corresponding processes in the foregoing method embodiments, and details are not described herein again.

The above description is only the specific embodiments of the present disclosure, but the protection scope of the present disclosure is not limited thereto, and any person skilled in the art can easily think of changes or substitutions within the technical scope disclosed in the present disclosure, which are all contained in the protection scope of the present disclosure. Therefore, the protection scope of the present disclosure is subject to the protection scope of the claims.

What is claimed is:

1. A method for controlling network congestion, comprising:
   performing, by a terminal device, a congestion control mechanism when a state of the terminal device changes, wherein the state of the terminal device is an access stratum state or a non-access stratum state;
   wherein after the state of the terminal device has changed, the method further comprises:
   suspending, by the terminal device, the congestion control mechanism;
   wherein the congestion control mechanism comprises first configuration information, wherein the first configuration information is at least one of the following information:
   probability information that the terminal device delays initiating first request information for requesting a first service, and probability information that the terminal device initiates first request information for requesting a first service within a configured delay time; and
   the performing, by a terminal device, a congestion control mechanism, comprises:
   transmitting, by the terminal device, the first request information to a network device to request the first service according to the first configuration information.

2. The method according to claim 1, wherein the first request information is the same or different type of information as request information for requesting the first service that was transmitted last time.

3. The method according to claim 1, wherein when the state of the terminal device is the access stratum state, the state of the terminal device is a radio resource control (RRC) state; and when the state of the terminal device is the non-access stratum state, the state of the terminal device is one of a connect management (CM) state, a register management (RM) state, and a session management (SM) state.

4. The method according to claim 3, wherein the RRC state comprises an idle state, a connected state, and an inactive state; the CM state comprises an idle state, a connected state, and a connected inactive state, and the RM state comprises a registered state and a deregistered state.

5. The method according to claim 1, wherein the congestion control mechanism is:
   one of control mechanism based on a terminal device, control mechanism based on a data network name (DNN) or an access point name (APN), control mechanism based on a packet data network (PDN) connection or a protocol data unit (PDU) session, and control mechanism based on a network slice; or combination of any two or more of control mechanism based on a terminal device, control mechanism based on a DNN or an APN, control mechanism based on a PDN connection or a PDU session, and control mechanism based on a network slice.

6. The method according to claim 1, wherein the method further comprises:
resuming, by the terminal device, performing the congestion control mechanism when the terminal device returns to a state before change.

7. A terminal device, comprising: a memory, a processor, and a transceiver, wherein,
the processor is configured to call and run a computer program stored in the memory to:
perform a congestion control mechanism when a state of the terminal device changes, wherein the state of the terminal device is an access stratum state or a non-access stratum state;
wherein after the state of the terminal device has changed, the processor is further configured to:
suspend the congestion control mechanism;
wherein the congestion control mechanism comprises first configuration information, wherein the first configuration information is at least one of the following information:
probability information that the terminal device delays initiating first request information for requesting a first service, and probability information that the terminal device initiates first request information for requesting a first service within a configured delay time; and
the processor is configured to control the transceiver to:
transmit the first request information to a network device to request the first service according to the first configuration information.

8. The terminal device according to claim 7, wherein the first request information is the same or different type of information as request information for requesting the first service that was transmitted last time.

9. The terminal device according to claim 7, wherein when the state of the terminal device is the access stratum state, the state of the terminal device is a radio resource control (RRC) state; and when the state of the terminal device is the non-access stratum state, the state of the terminal device is one of a connect management (CM) state, a register management (RM) state, and a session management (SM) state.

10. The terminal device according to claim 9, wherein the RRC state comprises an idle state, a connected state, and an inactive state; the CM state comprises an idle state, a connected state, and a connected inactive state, and the RM state includes a registered state and a deregistered state.

11. The terminal device according to claim 7, wherein the congestion control mechanism is:
one of control mechanism based on a terminal device, control mechanism based on a data network name (DNN) or an access point name (APN), control mechanism based on a packet data network (PDN) connection or a protocol data unit (PDU) session, and control mechanism based on a network slice; or
combination of any two or more of control mechanism based on a terminal device, control mechanism based on a DNN or an APN, control mechanism based on a PDN connection or a PDU session, and control mechanism based on a network slice.

12. The terminal device according to claim 7, wherein if the processor suspends the congestion control mechanism, the processor is further configured to:
resume performing the congestion control mechanism when the terminal device returns to a state before change.

13. The terminal device according to claim 7, wherein the processor is configured to:
control the transceiver to transmit the first request information to the network device, wherein the first request information is used to request a first service;
control the transceiver to receive indication information for the first request information that is transmitted by the network device when the network is in a congested state, wherein the indication information indicates the terminal device to perform the congestion control mechanism; and
perform the congestion control mechanism when requesting the first service in response to the indication information.

14. A non-transitory storage medium, wherein the storage medium is configured to store a computer program, the computer program causes a computer to perform the method for controlling network congestion according to claim 1.

15. A chip, comprising: a processor, configured to call and run a computer program from a memory, causing a device mounted with the chip to perform the method for controlling network congestion according to claim 1.

16. A wireless communication system, comprising: a terminal device and a network device; wherein
the terminal device is configured to perform a congestion control mechanism when a state of the terminal device changes; transmit first request information to the network device to request a first service according to first configuration information; and suspend the congestion control mechanism after the state of the terminal device has changed; wherein the state of the terminal device is an access stratum state or a non-access stratum state; and
the network device is configured to receive the first request information transmitted by the terminal device when the state of the terminal device changes, wherein the first request information is used to request the first service; and transmit indication information to the terminal device when the network is in a congested state, wherein the indication information is used to indicate the terminal device to perform the congestion control mechanism when requesting the first service;
wherein the congestion control mechanism comprises the first configuration information, wherein the first configuration information is at least one of the following information:
probability information that the terminal device delays initiating the first request information for requesting the first service, and probability information that the terminal device initiates the first request information for requesting the first service within a configured delay time.

* * * * *